United States Patent [19]

Seki et al.

[11] 4,312,650
[45] Jan. 26, 1982

[54] PARTICLE SEPARATOR

[75] Inventors: Masao Seki; Hideo Sato, both of Yokosuka; Takashi Kawata, Chiba; Akira Omori, Koganei; Hidekazu Abe, Yokohama, all of Japan

[73] Assignee: Ishikawajima-Harima Kukogto Kabushiki Kaisha, Japan

[21] Appl. No.: 194,888

[22] Filed: Oct. 7, 1980

[30] Foreign Application Priority Data

Oct. 31, 1979 [JP] Japan .................. 54-150227[U]

[51] Int. Cl.³ ............................................. B01D 45/12
[52] U.S. Cl. ................................. 55/459 B; 209/144
[58] Field of Search ............ 209/144, 211; 55/459 R, 55/459 B; 210/512.1, 512.2, 512.3

[56] References Cited

U.S. PATENT DOCUMENTS

| 474,490 | 5/1892 | Walter | 209/144 X |
|---|---|---|---|
| 2,681,124 | 6/1954 | van der Kolk | 55/459 R |
| 3,672,503 | 6/1972 | Mark | 209/144 |
| 3,907,671 | 9/1975 | Baigas, Jr. | 209/144 |
| 4,001,121 | 1/1977 | Bielefeldt | 209/211 X |
| 4,198,290 | 4/1980 | Sommers | 209/144 |

FOREIGN PATENT DOCUMENTS 54-47175  4/1979  Japan .

Primary Examiner—William A. Cuchlinski, Jr.
Attorney, Agent, or Firm—B. B. Olive

[57] ABSTRACT

A multi-stage particle separator provides a scroll and cylinder configuration in which the scroll establishes a swirling chamber and a first stage of separation and the cylinder establishes a continuing and second stage of separation.

2 Claims, 7 Drawing Figures

PARTICLE SEPARATOR

BACKGROUND OF THE INVENTION

The present invention relates to a particle separator.

In FIG. 1 is shown a prior art vertical cyclone separator which has been widely used because of its relatively high collection efficiency and simple construction, but it has some problems to be described below.

Firstly, it has a high pressure loss. Because of its underlying principle or structural feature, an upwardly spiralling vortex is forcibly formed at the inside of a double vortex, thus resulting in the consumption of large energy. For instance, in the case of a single stage, the pressure loss amounts to from 100 to 150 mmAq while in the case of a four stage, it becomes as high as from 400 to 600 mmAq. Such high pressure losses mean the high power consumption by a blower and/or an exhaust fan. Secondly, there exists limitations on the attempts of reducing its size. In order to attain a high collection efficiency, both the inlet and outlet velocities must be maintained from 10 to 20 m/sec. As a result, the axial velocity (which is defined as the ratio of the flow rate to the cross section of the cylinder c) becomes as low as less than 5 m/sec. In addition, because it is a vertical type, the cone d must be provided so that the increase in height results.

In FIG. 1 the solid-line arrow indicates the gas flow while the dotted-line arrow, the particle flow from the inlet a to the outlet b.

In view of the above, the primary object of the present invention is to provide a particle separator which consumes less power and can be made very compact in size.

In brief, according to the present invention, the power consumption of blowers and exhaust fans can be reduced; the pressure loss can be minimized; the capacity of a single-stage separator can be increased; and the height can be reduced so that the overall height of a multi-stage particle separation installation can be made low.

The above and other objects, features and effects of the present invention will become more apparent from the following description of preferred embodiments of the present invention taken in conjunction with the accompanying drawings.

BRIEF EXPLANATION OF THE DRAWINGS

The same reference numerals are used to designate similar parts throughout the figures.

DETAILED DESCRIPTION OF THE PREFERRED EMBODIMENTS

Figure 1:
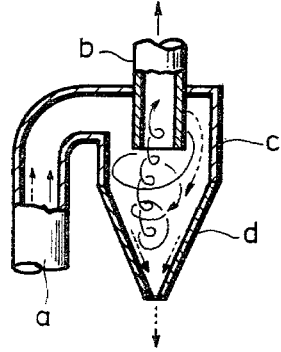
FIG. 1 is a schematic longitudinal sectional view of a prior art cyclone separator.

Referring to FIGS. 2 through 5, a first embodiment of a particle separator in accordance with the present invention has a cylinder 1, a scroll 2 with a particle-laden gas inlet 3 and a first particle outlet 4, a second particle outlet 5 and a gas outlet 6.

Figure 3:
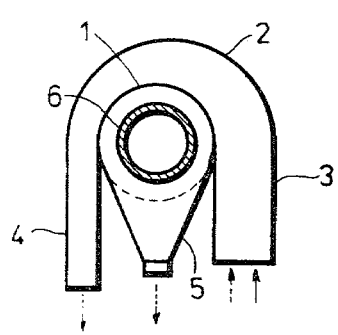
FIG. 3 is an end view looking in the direction indicated by the arrows III in FIG. 2.

The scroll 2, which is also referred to as "the swirling duct" in this specification and which is semicircular when viewed from one end as shown in FIG. 3, is mounted on the cylinder 1, which is disposed horizontally, and is communicated with the cylinder 1 so that a swirling chamber is defined.

Figure 4:
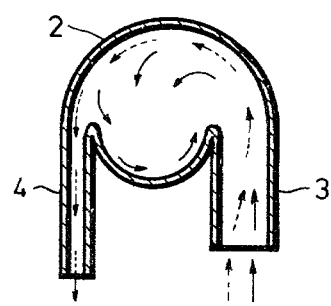
FIG. 4 is a cross sectional view taken along the line IV—IV of FIG. 2.

As best shown in FIG. 4, the dust-laden gas flows through the inlet 3 into the swirling chamber. Then the particles entrained by the gas are subjected to the centrifugal force so as to flow along the inside walls of the scroll or swirling duct 2 as indicated by the dotted-line arrows into the first particle outlet 4 extended downward from the scroll or swirling duct 2 tangentially thereof. On the other hand, the gas free from the particles swirls in the swirling chamber as indicated by the solid-line arrows, flows into the cylinder 1 and is discharged through the gas outlet 6.

Figure 2:
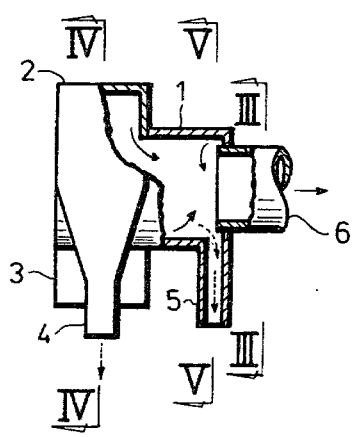
FIG. 2 is a schematic side view, partly broken, of a first embodiment of the present invention.
Figure 5:
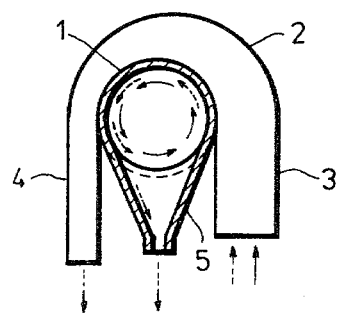
FIG. 5 is a cross sectional view taken along the line V—V of FIG. 2.

In the cylinder 1 the gas still swirls while flowing axially toward the gas outlet 6 so that the particles still entrained in the gas are again subjected to the centrifugal force so as to flow along the inside walls of the cylinder 1 into the second particle outlet 5 extended downward from the bottom of the cylinder 1 adjacent to the gas outlet 6 as best shown in FIG. 5. As best shown in FIG. 2, the gas outlet 6 is extended out of the cylinder 1 coaxially thereof and has an inner diameter slightly smaller than that of the cylinder 1, whereby the collection efficiency of the second particle outlet 5 can be improved.

Experiments of the first embodiment shown in FIGS. 2 through 5 were made with the air laden with cement materials. The cement materials were collected through the first particle outlet 4 at such high a collection efficiency of from 80 to 90%. When the second particle outlet 5 is added, the collection efficiency jumps to from 91 to 95%.

In the first embodiment, the flow pattern consists mainly of free swirls or whirls with the resultant decrease in energy or pressure loss. As a result, even when the gas velocity in the cylinder is increased to from 8 to 12 m/sec with the inlet velocity of from 15 to 20 m/sec, the pressure loss is only from 30 to 80 mmAq, which is about from ½ to ⅓ as compared with the prior art cyclone separators.

Figure 6:
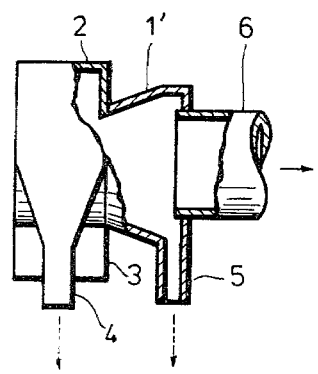
FIG. 6 is a schematic side elevation view, partly broken, of a second embodiment of the present invention.

A second embodiment shown in FIG. 6 is substantially similar in construction to the first embodiment described above with reference to FIGS. 2 through 5 except that instead of the cylinder 1, a cone or a frustum of right circular cone 1' is used.

Figure 7:
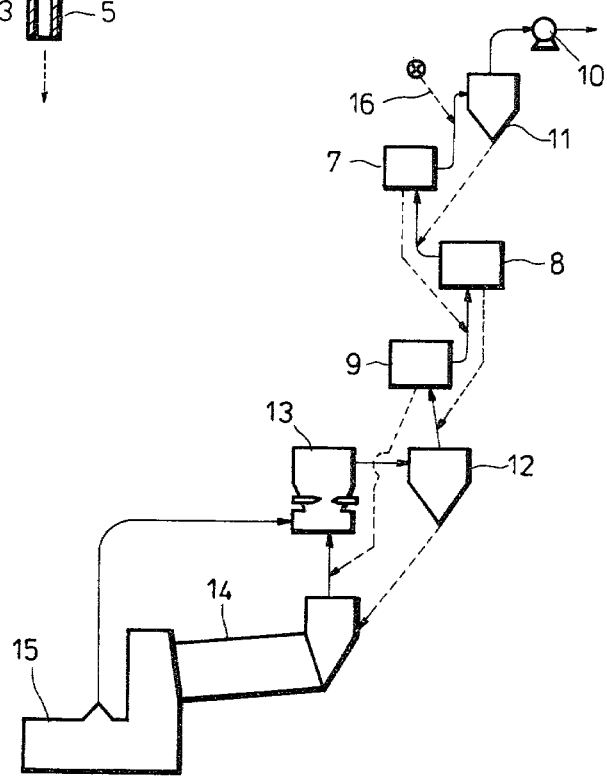
FIG. 7 shows a layout of a plant in which are used the particle separators in accordance with the present invention.

Next referring to FIG. 7, one example of the applications of the particle separators in accordance with the present invention will be described. In FIG. 7 is shown a flow chart of a process for cement calcination in which are used particle separators 7, 8 and 9 of the present invention as the preheaters. The process further includes a main exhaust fan 10, an uppermost cyclone separator 11 of the prior art type, a lowermost cyclone separator 12 which is also of the prior art type, a flow calcination furnace 13, a rotary kiln 14, a clinker cooler 15 and a cement material charging chute 16.

As indicated by the solid-line arrows, both the air which has been pre-heated in the clinker cooler 15 and the combustion gases from the rotary kiln 14 flow into the calcination furnace 13 and the gas from the calcination furnace 13 flows through the lowermost cyclone separator 12, three particle separators 9, 8 and 7, and the uppermost cyclone separator 11 in the order named into the main exhaust fan 10. On the other hand, the cement materials in the form of powder, which will be referred to as "the particles" for brevity hereinafter, are charged from the chute 16 into a duct intercommunicating between the uppermost cyclone separator 11 and the first particle separator 7 of the present invention. Thereafter, as indicated by the dotted-line arrows, the particles flow from the uppermost cyclone separator 11, through three particle separators 7, 8 and 9 of the present invention, the calcination furnace 13 and the lowermost cyclone separator 12 into the rotary kiln 14. Cement clinker is discharged from the rotary kiln 14 into the clinker cooler 15.

In the process shown in FIG. 7, three particle separators 7, 8 and 9 of the present invention are used in the intermediate stages, but it is to be understood that the number of such separators may be increased or decreased as needs demand.

In summary, according to the present invention, the flow pattern mainly consists of the free swirls with the resultant decrease in energy consumption. As a result, the pressure drop becomes about from $\frac{1}{2}$ to $\frac{1}{3}$ as compared with the prior art cyclone separator, whereby the power consumption of the blowers and exhaust fans can be drastically reduced. While the use of a single stage can attain the satisfactory effects and advantages of the present invention, the advantage of the saving in energy becomes more pronounced when four or five stages are used. In addition, the swirling chamber which is defined by the semicircular scroll or swirling duct 2 and part of the cylinder 1 or cone 1' is of the horizontal type, and the flow velocity in this chamber can be increased. As a result, the particle separator in accordance with the present invention can be made very compact in size. This advantages results another advantage in that the overall height of a four or five stage preheater used in a cement calcination process as described with reference to FIG. 7 can be made lower.

What is claimed is:
1. A particle separator comprising:
(a) a cylinder disposed substantially horizontally;
(b) a scroll disposed so as to surround and between the ends thereof communicate with substantially the upper half of said cylinder at one end thereof and for a portion of its length thereby defining a swirling chamber;
(c) a substantially vertical inlet extending from and communicating with one end of said scroll enabling dust or particle laden gas flowing through said inlet to swirl in said swirling chamber;
(d) a first substantially vertical dust-particle outlet extending from and communicating with the other end of said scroll enabling dust or solid particles separated from gas in said swirling chamber to flow into said first outlet;
(e) a gas outlet extending from the other end of said cylinder and mounted coaxially thereof for discharging gas from said cylinder through said gas outlet; and
(f) a second substantially vertical dust-particle outlet extending from the bottom of said cylinder adjacent said gas outlet providing means for dust or solid particles still entrained in the gas flowing through said cylinder to be collected in said second dust-particle outlet.

2. A particle separator as claimed in claim 1 wherein said cylinder between said scroll and gas outlet is formed with a diameter which gradually increases toward said gas outlet.

* * * * *